United States Patent [19]

Shibata

[11] Patent Number: 5,178,698
[45] Date of Patent: Jan. 12, 1993

[54] PNEUMATIC TIRE TREAD WITH VARYING BLOCK LENGTHS AND VARYING MAIN GROOVE WIDTHS

[75] Inventor: Kouji Shibata, Uji, Japan

[73] Assignee: Sumitomo Rubber Industries, Ltd., Kobe, Japan

[21] Appl. No.: 814,630

[22] Filed: Dec. 30, 1991

[30] Foreign Application Priority Data

Jan. 16, 1991 [JP] Japan .................................. 3-17060

[51] Int. Cl.$^5$ ............................................. B60C 11/11
[52] U.S. Cl. ................................. 152/209 R; D12/146
[58] Field of Search ....................... 152/209 R, 209 D; D12/146, 147

[56] References Cited

U.S. PATENT DOCUMENTS

| | | | |
|---|---|---|---|
| D. 299,329 | 1/1989 | Wallet et al. ...................... | D12/146 |
| D. 309,591 | 7/1990 | Guermandi et al. ............... | D12/147 |
| D. 311,886 | 11/1990 | Covert et al. ...................... | D12/146 |
| D. 316,067 | 4/1991 | Hammond et al. ................. | D12/146 |
| 4,327,792 | 5/1982 | Landers ............................ | 152/209 R |
| 4,462,446 | 7/1984 | Goergen et al. ................... | 152/209 R |

FOREIGN PATENT DOCUMENTS

| | | | |
|---|---|---|---|
| 0175829 | 4/1986 | European Pat. Off. ......... | 152/209 R |
| 0268436 | 5/1988 | European Pat. Off. . | |
| 0367557 | 5/1990 | European Pat. Off. . | |
| 0454658 | 10/1991 | European Pat. Off. ......... | 152/209 D |
| 61-27708 | 2/1986 | Japan . | |
| 0115704 | 6/1986 | Japan .............................. | 152/209 D |
| 63-275407 | 11/1988 | Japan . | |
| 63-306903 | 12/1988 | Japan . | |

*Primary Examiner*—Michael W. Ball
*Assistant Examiner*—Nancy T. Krawczyk

[57] ABSTRACT

A pneumatic tire which has a tread portion (2) provided with a pair of circumferentially extending main grooves (G) one on each side of the tire equator (C) to define an axially outermost circumferential part (SH) between each main groove and each tread edge (E); each said axially outermost circumferential part (SH) provided with lateral grooves (gs) extending from the adjacent main groove to the adjacent tread edge to be divided into a row of circumferentially spaced shoulder blocks (BS); the shoulder blocks (BS) in each row having at least two different circumferential lengths; the first quotient (Lmax/Lmin) of the maximum (Lmax) of the circumferential lengths divided by the minimum (Lmin) thereof being in the range of 1.25 to 2.00; the width (W) of each main groove changed in the circumferential direction of the tire such that the larger the circumferential length of the shoulder block, the larger the width of a main groove part adjacent to this block; and the second quotient (Wmax/Wmin) of the maximum (Wmax) of the main groove width divided by the minimum (Wmin) thereof being in the range of 1.1 to the first quotient (Lmax/Lmin).

4 Claims, 3 Drawing Sheets

PNEUMATIC TIRE TREAD WITH VARYING BLOCK LENGTHS AND VARYING MAIN GROOVE WIDTHS

BACKGROUND OF THE INVENTION

The present invention relates to a pneumatic tire, more particularly an improvement in a tread pattern, in which wet performance and low noise performance are both improved.

In general, a tire tread portion is provided with grooves for water drainage. However, such tread grooves especially lateral grooves make noise during running.

In order to reduce such a noise, the so called "variable pitching method" has been widely used. In such method, the circumferential pitches of lateral grooves are varied so as to change pulse noises generated from the lateral grooves to so called "white noise". As a result, the circumferential lengths of the resultant blocks between the lateral grooves are varied, and relatively long blocks are formed.

However, when long blocks are formed, lateral drainage at those portions is hindered, and water is liable to remain undischarged, which deteriorates the wet performance. To promote discharge, the width of the main groove (wide circumferential groove) can be increased, but due to resonance of the main groove high-frequency, noise increases, which deteriorates the low noise performance.

SUMMARY OF THE INVENTION

It is therefore, an object of the present invention to provide a pneumatic tire of which wet performance and low noise performance are improved.

According to one aspect of the present invention, a pneumatic tire has a tread portion provided with a pair of circumferentially extending main grooves one on each side of the tire equator to define an axially outermost circumferential part between each main groove and each tread edge, each said axially outermost circumferential part being provided with lateral grooves extending from the adjacent main groove to the adjacent tread edge to be divided into a row of circumferentially spaced shoulder blocks having at least two different circumferential lengths, the first quotient (Lmax/Lmin) of the maximum of the circumferential lengths divided by the minimum thereof being in the range of 1.25 to 2.00, the width of each main groove changed in the circumferential direction of the tire such that the larger the circumferential length of the shoulder block, the larger the width of a main groove part adjacent to this block, and the second quotient (Wmax/Wmin) of the maximum of the main groove width divided by the minimum thereof being in the range of 1.1 to the first quotient (Lmax/Lmin).

Therefore, the widened part of the main groove promotes discharge of the water between the tread and ground. Further, this part can hold a larger volume of water which is eliminated from the block surfaces.

Further, as the width of the main groove is varied along its length, resonance thereof is prevented or damped. Accordingly, the generation of high-frequency noise is effectively prevented.

BRIEF DESCRIPTION OF THE DRAWINGS

Embodiments of the present invention will now be described in detail in conjunction with the accompanying drawings, in which.

DETAILED DESCRIPTION OF THE EMBODIMENTS

Figure 1:
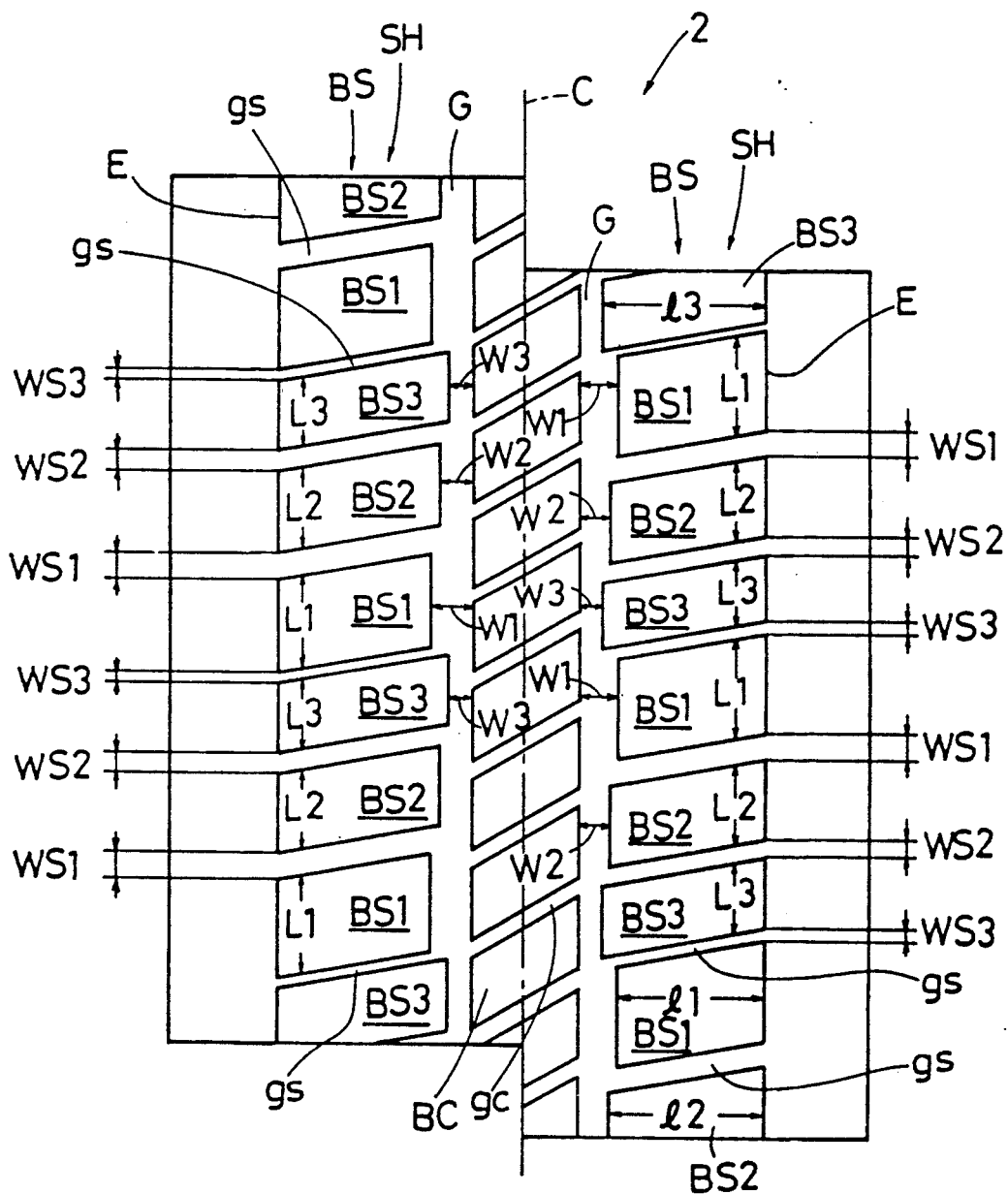
FIG. 1 is a developed plan view of a tire according to the invention showing the tread pattern thereof.

In the figures, pneumatic tire 1 has a tread portion 2, a pair of axially spaced bead portions 15, and a pair of sidewall portions 13 extending between the tread edges (E) and the bead portions 15, and the tire 1 comprises:

a pair of bead cores 16 disposed one in each bead portion 15, a carcass 17 extending between the bead portions 15 and turned up around the bead cores 16 from the axially inside to the outside thereof to be secured thereto, a belt 19 disposed radially outside the carcass 17, and a rubber tread disposed radially outside the belt 19 to define the tread portion 2.

FIG. 1 shows a tread pattern according to the invention.

The tread portion 2 is provided with a plurality of circumferentially extending main grooves (in this example, only two grooves G) so as to divide the tread portion 2 into a pair of axially outermost circumferential parts (shoulder parts SH) and at least one circumferential part therebetween.

The tread portion 2 is further provided with lateral grooves (gc) and (gs).

The lateral grooves (gs) extend from the axially outermost main groove (G) to the tread edge (E) across the whole width of the axially outermost circumferential part (SH) so as to divide this part into a row of shoulder blocks (BS).

The lateral grooves (gc) extend from one of the main grooves (G) to the adjacent main groove (G) across the whole width of the inner circumferential part so as to divide this part into a row of inner blocks (BC).

The shoulder blocks (BS) have at least two different circumferential lengths (L), in this example, three lengths. The longest block (BS1) has a length (L1), the middle-length block (BS2) has a length (L2), and the shortest block (BS3) has a length (L3). (L1>L2>L1)

Here, the quotient (Lmax/Lmin=L1/L3) of the maximum block length (Lmax=L1) of the longest block (BS1) divided by the minimum block length (Lmin=L3) of the shortest block (BS3) is in the range of 1.25 to 2.00. When the quotient is less than 1.25, noise reducing effect is low. When the quotient is more than 2.00, steering stability especially during cornering is impaired, and further uneven wear, heel-and-toe wear of the blocks is liable to occur.

Each of the shoulder blocks (BS) has two axial edges and two circumferential edges. The axially outer edge is straight and forms a part of the tread edge (E). The axially inner edge in this embodiment is made of a straight line parallel with the tire circumferential direction. However, the axially inner edge may be made of a zigzag line consisting of one or more segments parallel with the tire circumferential direction and one or more segments parallel with the tire axial direction, or a curved line which is generally parallel with the tire circumferential direction. The circumferential edges in this embodiment are parallel with each other and straight. However, it can be possible to use a slightly curved line. The shape of each shoulder block in this embodiment is parallelogram.

The groove width (W) of the axially outermost main groove (G) is changed in its longitudinal direction or the circumferential direction of the tire according to the circumferential lengths of the adjacent shoulder blocks such that if the shoulder block is relatively longer, the main groove part adjacent to the same block has a relatively wider width, or if the shoulder block is relatively shorter, the main groove part adjacent to the same block has a relatively narrower width.

In this embodiment, a groove part axially inward of each of the longest blocks (BS1) has a widest width (W1), a groove part axially inward of each of the shortest blocks (BS3) has a narrowest width (W3), and a groove part axially inward of each of the middle-length blocks (BS2) has a middle width (W2).

The quotient (Wmax/Wmin=W1/W3) of the maximum width (Wmax=W1) divided by the minimum width (Wmin=W3) is in the range of 1.1 to the above-mentioned quotient (Lmax/Lmin). If Wmax/Wmin is less than the lower limit of 1.1, a noise damping effect can not be obtained. If Wmax/Wmin is more than the upper limit, partial wear and uneven wear are liable to occur.

Further, in this embodiment, the above-mentioned main groove width change is made by changing only the axial widths of the shoulder blocks (BS) or by changing the axial positions of the axially inner edges of the shoulder blocks (BS) such that the longer the shoulder block, the axially outer the edge position. That is, the axially outward groove wall of the axially outermost main groove is changed and the axially inward groove wall thereof is not changed. The axially inward groove wall is straight and parallel with the tire circumferential direction. That is, the axially outer edges of the inner blocks (BC) are straight and aligned in line. Each axially outermost main groove is considered to be generally straight.

In this invention, however, the axial position of the axially inward groove wall can be changed either alone or in combination with the axially outward groove wall change. Further, the axially outer edge of each inner block may be made of a zigzag line consisting of one or more segments parallel with the tire circumferential direction and one or more segments parallel with the tire axial direction, or a slightly curved line which is generally parallel with the tire circumferential direction.

The axial widths (l) of the shoulder blocks (BS) are such that the larger the circumferential length (L), the smaller the axial width (l). Because, L1>L2>L3, l1<L2>l3, where l1, l2 and l3 are the axial widths of the shoulder blocks (BS1), (BS2) and (BS3), respectively.

By changing the shoulder block width as mentioned above, the water path from the axially outermost main groove to the tread edge becomes shorter at the longer block position. Accordingly, the axially outward drainage is improved. Therefore, it is preferable to change only the axially outer wall of the main groove.

The axially outermost lateral grooves (gs) in each row are inclined towards the same direction at the substantially same angle with respect to the tire equator (C).

Further, the widths (WS) of the axially outermost lateral grooves (gs) in each row are changed according to the lengths (L) of the shoulder blocks (BS) such that if the shoulder block is relatively longer, one of the adjacent lateral grooves has a relatively wider width, or if the shoulder block is relatively shorter, one of the adjacent lateral grooves has a relatively narrower width. This relation therebetween is always towards one circumferential direction within each block row. In FIG. 1, within the right side shoulder block row, it is downward. That is, according to the length of the shoulder block the width of its under lateral groove is changed. On the other hand, within the left side shoulder block row, it is upward. That is, according to the length of the shoulder block the width of its upper lateral groove is changed. In the right side shoulder block row, the lateral groove adjacent to the lower circumferential edge of the longest shoulder block (BS1) has a largest width (WS1), the lateral groove adjacent to the lower circumferential edge of the middle-length shoulder block (BS2) has a middle width (WS2), and the lateral groove adjacent to the lower circumferential edge of the shortest shoulder block (BS3) has a smallest width (WS3).

The quotient (WSmax/WSmin=WS1/WS3) of the maximum width (WSmax=WS1) divided by the minimum width (WSmin=WS3) is in the range of 0.6 times to 0.9 times the quotient (Lmax/Lmin). As a result, the variation of the lateral groove widths becomes smaller than the variation of the block lengths, and the pulse noise therefrom is lessened.

Further, the inner lateral grooves (gc) are extended across the tire equator C and inclined at the same angle towards the same direction as the axially adjacent lateral grooves or the axially outermost lateral grooves in this embodiment. Therefore, in FIG. 1, all the lateral grooves (gs) and (gc) have right-side-upward inclinations.

In this embodiment, the inner lateral grooves are arranged at regular intervals or pitches in the circumferential direction.

In the present invention, for each of the block rows inclusive of the inner block row, any known or unknown "variable pitching method" for changing pulse noise generated from each lateral groove to so called "white noise" as a whole, can be employed.

In FIG. 1, the shoulder block arrangement is

```
BS1      BS2      BS3      BS1      BS2      BS3      BS1 - - - repeat
|<--->|<--->|<--->|<--->|<--->|<--->|
 WS1      WS2      WS3      WS1      WS2      WS3
<------------------->  <------------------->   pattern cycle
```

That is, the circumferential length sequence is

Long  Middle  Short  Long  Middle  Short - - - - - - - and the lateral groove width sequence is

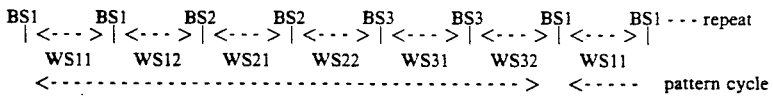

The following is another example of the shoulder block arrangement. This can be however, used as the inner block arrangement.

```
   BS1      BS1      BS2      BS2      BS3      BS3      BS1      BS1  --- repeat
 |<--->|  |<--->|  |<--->|  |<--->|  |<--->|  |<--->|  |<--->|
  WS11     WS12     WS21     WS22     WS31     WS32     WS11
 <---------------------------------------------------->   <----- pattern cycle
```

The lateral groove widths (WS11, WS12, WS21, WS22, WS31, WS32) are as follows:

WS11 = WS12 > WS21 = WS22 > WS31 = WS32
WS max = WS11        WS min = WS32 but the following relation can be possible.

WS11 > WS12 > WS21 > WS22 > WS31 > WS32

The above-explained two examples are called "three pitch variation" as three different lengths are used.

In the present invention, two pitch, four pitch, five or more pitch variation can be used.

Figure 3:
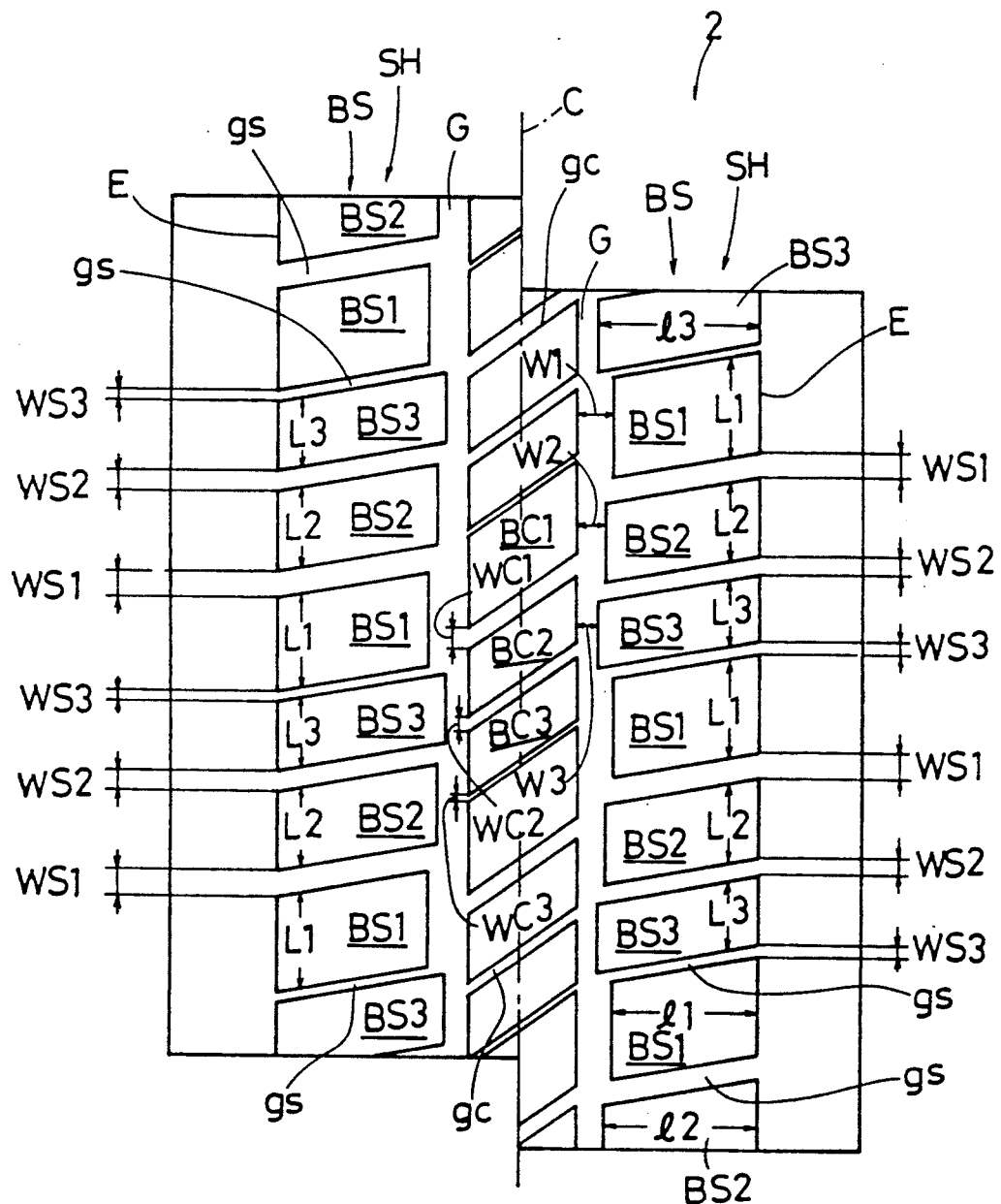
FIG. 3 is a developed plan view of another tire according to the invention showing the tread pattern thereof.

FIG. 3 shows a modification of the tread pattern shown in FIG. 1, wherein the inner lateral groove pitching is modified, and similar to the shoulder block rows in the former example shown in FIG. 1, the lateral groove widths are changed according to the block lengths.

Similar to the shoulder blocks, the central blocks (BC) have at least two different circumferential lengths, in this embodiment, three lengths. The longest block (BC1), middle-length block (BC2), and shortest block (BC3) have lengths (L1), (L2) and (L3), respectively.

The widths (WC) of the central lateral grooves (gc) in one row are changed in the same manner as above according to the lengths (L) of the central blocks (BC). That is, if the central block is relatively longer, one of the adjacent lateral grooves has a relatively wider width, or if the central block is relatively shorter, one of the adjacent lateral grooves has a relatively narrower width.

The quotient (Lmax/Lmin=L1/L3) of the maximum block length (Lmax=L1) of the longest block (BC1) divided by the minimum block length (Lmin=L3) of the shortest block (BC3) is in the range of 1.25 to 2.00.

The quotient (WCmax/WCmin=WC1/WC3) of the maximum width (WCmax=WC1) divided by the minimum width (WCmin=WC3) is in the range of 0.6 times to 0.9 times the quotient (Lmax/Lmin).

As mentioned above, any known or unknown "variable pitching method" or block arrangement can be employed in the present invention.

In the above-explained tread patterns, with respect to one circumferential direction or rotational direction, the sequence of the right side shoulder blocks is reversed to that of the left side shoulder blocks. Further, to avoid at least coincidence of the small size blocks on one side with the small size blocks on the other side, the blocks on one side are shifted from those on the other side in the circumferential direction as shown in the figures, whereby the variation of the tread rigidity in the circumferential direction is reduced, and the low noise performance can be further improved.

Figure 2:
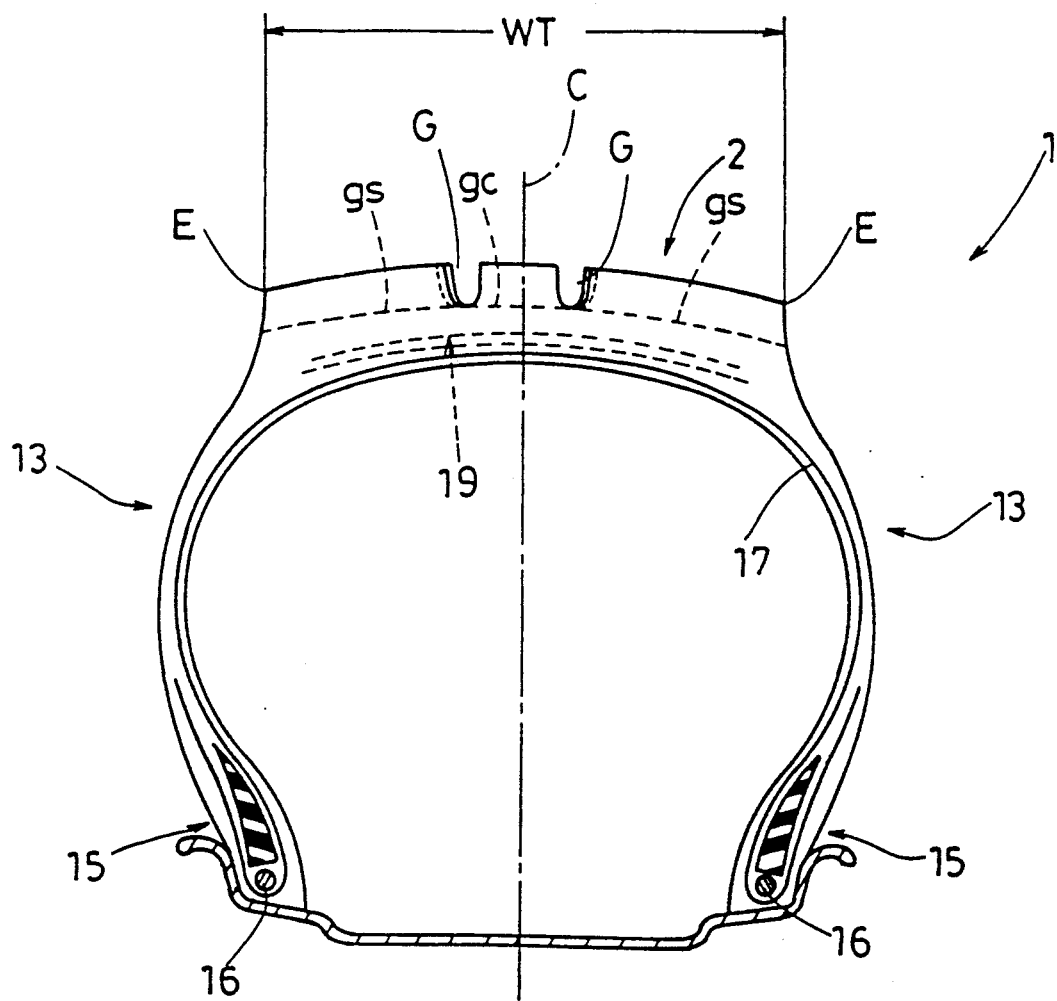
FIG. 2 is a cross sectional view of the tire of FIG. 1.

Tires of size 195/65R15 for passenger car were prepared and tested for noise and wet performance. The test tires had the same construction: the structure shown in FIG. 2 and the tread pattern shown in FIG. 3, except for the shoulder blocks. The specifications thereof and test results are given in Table 1.

A) Noise Test

Running a passenger car on a dry test course at a speed of 60 km/h, which was provided with the test tire mounted on its regular rim and inflated to its regular pressure, the generated noise was evaluated into five ranks by the driver. The larger the value, the better the low noise performance.

B) Wet Performance Test a) Cornering Test

Running a passenger car provided with the test tire mounted on its regular rim and inflated to its regular pressure, on a wet test course at a predetermined radius, the critical cornering speed was measured.

b) Straight Running Test

Aquaplaning generating speed was measured.

The measured results are indicated in Table 1 by an index based on that the reference tire 1 is 100. The larger the index, the better the performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

|  | Ex. 1 | Ref. 1 | Ref. 2 | Ref. 3 |
|---|---|---|---|---|
| Shoulder block Length (L) mm | | | | |
| L1 | 16.6 | 16.6 | 16.6 | 15.6 |
| L2 | 20.4 | 20.0 | 20.0 | 19.0 |
| L3 | 29.8 | 29.0 | 29.0 | 28.0 |
| Width (l) mm | | | | |
| l1 | 40.0 | 40.0 | 40.0 | 40.0 |
| l2 | 38.5 | 40.0 | 40.0 | 40.0 |
| l3 | 37.0 | 40.0 | 40.0 | 40.0 |
| Main groove Width (W) mm | | | | |
| W1 | 9.0 | 9.0 | 12.0 | 9.0 |
| W2 | 10.5 | 9.0 | 12.0 | 9.0 |
| W3 | 12.0 | 9.0 | 12.0 | 9.0 |
| Lateral groove (gs) Width (WS) mm | | | | |
| WS1 | 3.4 | 3.4 | 3.4 | 4.4 |
| WS2 | 3.8 | 4.2 | 4.2 | 5.2 |
| WS3 | 4.2 | 5.0 | 5.0 | 6.0 |
| TEST RESULTS Noise performance | | | | |
| Pitch | 3.1 | 3.0 | 3.0 | 2.5 |
| High-frequency | 3.0 | 3.0 | 2.5 | 2.9 |
| Wet Performance | | | | |
| Straight | 105 | 100 | 115 | 101 |
| Cornering | 115 | 100 | 130 | 115 |

I claim:

1. A pneumatic tire having
  a tread portion (2) provided with a pair of circumferentially extending main grooves (G) one on each side of the tire equator (C) to define an axially outermost circumferential part (SH) between each main groove and each tread edge (E), each said axially outermost circumferential part (SH) provided with lateral groves (gs) extending from the adjacent main groove to the adjacent tread edge to be divided into a row of circumferentially spaced shoulder blocks (BS) which have at least two different circumferential lengths, a first quotient (Lmax/Lmin) of the maximum (Lmax) of the circumferential lengths of the shoulder blocks (BS) divided by the minimum (Lmin) thereof being in the range of 1.25 to 2.00, the width (W) of each main groove changes in the circumferential direction of the tire such that the larger the circumferential length of the shoulder block, the larger the width of a main groove part adjacent to this block, and a second quotient (Wmax/Wmin) of the maximum (Wmax) of the main groove width divided by the minimum (Wmin) thereof being in the range of 1.1 to the first quotient (Lmax/Lmin).

2. The tire according to claim 1, wherein within each said axially outermost circumferential part (SH), the widths (WS) of the lateral grooves (gs) depend upon the circumferential lengths (L) of the adjacent shoulder blocks (BS) such that the lateral groove adjacent to one of the circumferential edges of the longer lateral block is wider than the lateral groove adjacent to the same side circumferential edge of the shorter lateral block as said edge of the longer lateral groove, and a third quotient (WSmax/WSmin) of the width (WSmax) of the widest lateral groove divided by the width (WSmin) of the narrowest lateral groove is in the range of 0.6 times to 0.9 times the first quotient (Lmax/Lmin).

3. The tire according to claim 2, wherein the widths (WS) of the lateral grooves (gs) in each said axially outermost circumferential part (SH) vary such that the larger the circumferential length of the shoulder block (BS), the larger the width of one of the two lateral grooves adjacent to this block.

4. The tire according to claim 1, 2 or 3, wherein said tread portion (2) is provided between said a pair of main grooves (G) with at least one circumferential row of inner blocks (BC) divided circumferentially by inner lateral grooves (gc), said inner blocks (BC) have at least two different circumferential lengths, a fourth quotient (Lmax/Lmin) of the maximum (Lmax) of the circumferential lengths of the inner blocks (BC) divided by the minimum (Lmin) thereof is in the range of 1.25 to 2.00, the widths of the inner lateral grooves vary such that the larger the circumferential length of the inner block, the larger the width of one of the two lateral grooves adjacent to this inner block, and a fifth quotient (WCmax/WCmin) of the width (WCmax) of the widest inner lateral groove divided by the width (WCmin) of the narrowest inner lateral groove is in the range of 0.6 times to 0.9 times the fourth quotient (Lmax/Lmin).

* * * * *